United States Patent [19]
Boerstler et al.

[11] Patent Number: 5,175,641
[45] Date of Patent: Dec. 29, 1992

[54] DUAL-MODE LASER DIODE TRANSMITTER

[75] Inventors: David W. Boerstler, Millbrook; Bert W. Weidle, Ulster Park, both of N.Y.

[73] Assignee: International Business Machines Corporation, Armonk, N.Y.

[21] Appl. No.: 681,019

[22] Filed: Apr. 5, 1991

[51] Int. Cl.$^5$ ............................................. H04B 10/04
[52] U.S. Cl. ....................................... 359/180; 372/38; 250/205
[58] Field of Search ............... 359/180, 181, 188, 154, 359/173; 372/38, 29, 32, 25–26; 250/205

[56] References Cited

U.S. PATENT DOCUMENTS

| | | | |
|---|---|---|---|
| 4,558,465 | 12/1985 | Siegel et al. | 359/180 |
| 4,592,057 | 5/1986 | Comerford | 372/8 |
| 4,612,671 | 9/1986 | Gites | 359/180 |
| 4,718,118 | 1/1988 | Viola | 359/180 |
| 4,837,428 | 6/1989 | Takagi et al. | 250/205 |

FOREIGN PATENT DOCUMENTS 0155322  6/1990  Japan ..................... 359/180

Primary Examiner—Edward L. Coles, Sr.
Assistant Examiner—Kinfe-Michael Negash
Attorney, Agent, or Firm—Michael J. Scheer; William A. Kinnaman

[57] ABSTRACT

A semiconductor injection laser diode is coupled via a switch to two drivers. One driver provides a drive current above the threshold current required to cause the injection laser diode to lase. The other driver provides a drive current below this threshold current, causing the laser diode to operate in a light-emitting diode (LED) mode. The switch couples the laser diode to one or the other of the drivers depending upon the receiver to which the transmitter is coupled.

2 Claims, 1 Drawing Sheet

DUAL-MODE LASER DIODE TRANSMITTER

BACKGROUND OF THE INVENTION

1. Field of the Invention

The present invention relates generally to optical data transmission and more particularly to a transmitter which can selectively transmit data in either one of two operating modes: a low-power light-emitting diode mode and a high-power laser diode mode.

2. Description of the Related Art

Presently, components of some computer systems transmit data over fiber optic links. Optical data transmission networks in use today commonly employ a light-emitting diode (LED) transmitter coupled by a fiber optic link to a PIN photodetector receiver. Another optical data transmission network in use now, which will become more prevalent in the future, uses an injection laser diode transmitter.

The power output of an injection laser diode transmitter is considerably higher than the power output of a light-emitting diode; for example, the power output of a laser diode is about 1 milliwatt as compared with a power output for a light-emitting diode of about 0.02 milliwatts. The output of a laser diode transmitter would saturate a receiver designed for use with a light-emitting diode transmitter. While it is possible to provide a different transmitter matched to the intended receiver, the direct and indirect costs of such an approach are high.

SUMMARY OF THE INVENTION

An object of this invention is the provision of a transmitter that can operate in either of two modes; as an injection laser diode transmitter or as a light-emitting diode transmitter. A related object is the provision of an optical data transmitter that can be switched between two operating modes; one mode compatible with receivers designed for use with light-emitting diode transmitters and another mode compatible with laser diode transmitters.

Briefly, this invention contemplates the provision of a semiconductor injection laser diode coupled via a switch to two drivers. One driver provides a drive current above the threshold current required to cause the injection laser diode to lase. The other driver provides a drive current below this threshold current, causing the laser diode to operate as a light-emitting diode. The switch couples the laser diode to one or the other of the drivers depending upon the receiver.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF THE PREFERRED EMBODIMENT

Figure 1:
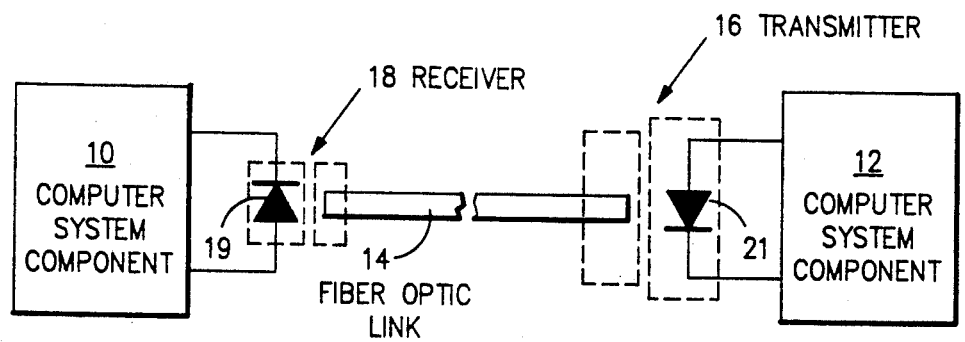
FIG. 1 is a block diagram illustrating conventional computer system components with an optical data transmitter and receiver coupled together over a fiber optic data link.

Referring now to FIG. 1, a typical computer system has components 10 and 12, such as for example a mass storage unit and a central processor, interconnected by a fiber optic data transmission link 14. One end of the fiber optic link is optically coupled to a transmitter 16 and the other end is optically coupled to a receiver 18.

The receiver 18 includes a photodetector 19, such as a PIN semiconductor photodiode. If intended for use with a semiconductor light-emitting diode transmitter, a photodiode receiver designed to respond to relatively low light intensity is used, for example, a highly sensitive transimpedance amplifier. If intended for use with a laser diode transmitter, a photodiode receiver designed to respond to relatively high light intensity is used, for example a nonsaturating transimpedance amplifier. As will be explained in greater detail in connection with FIGS. 2 and 3, a single semiconductor device 21 is used and operated in one of two modes depending upon the type of transmitter with which receiver 18 is designed to work.

Figure 2:
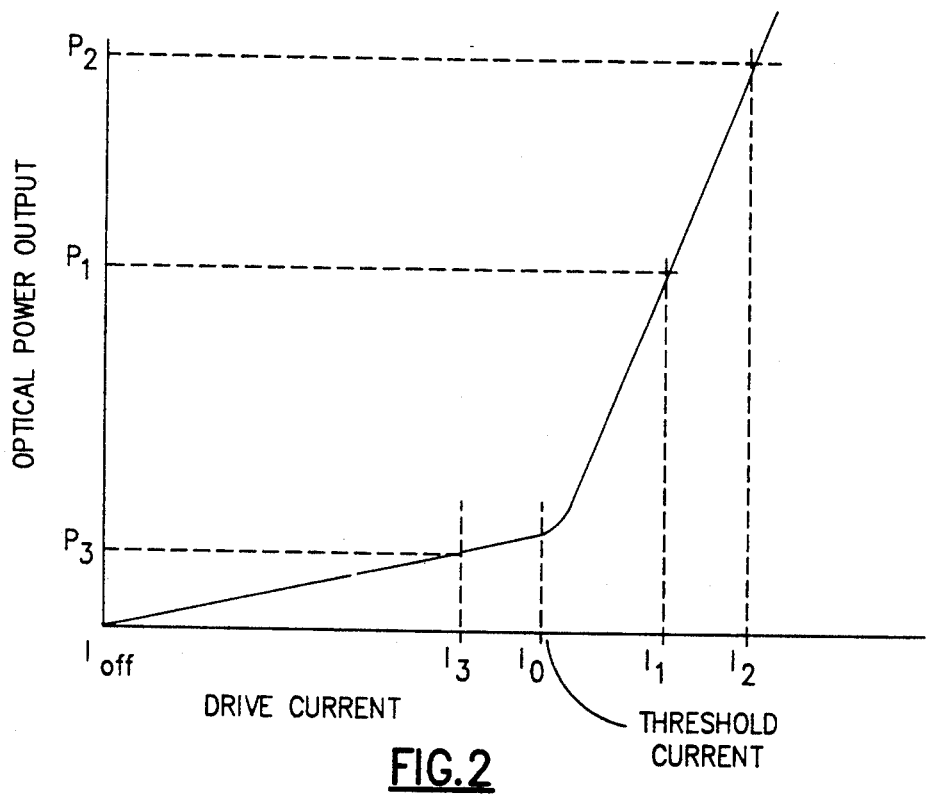
FIG. 2 is a plot of output power vs. bias current typical for an injection laser diode.

FIG. 2 is a plot of optical power output vs. drive current for a typical semiconductor injection laser diode. As will be appreciated by those skilled in the art, at a drive current level above the knee of the curve (labeled threshold current $I_0$), there is sufficient current input to cause the injection laser diode to lase, generating relatively high-power, coherent light output. At drive currents below this threshold current $I_0$, an injection laser diode does not lase, but does generate a spontaneous emission light output whose power level is in the range of that generated by conventional commercial light-emitting diodes used for data transmission.

Figure 3:
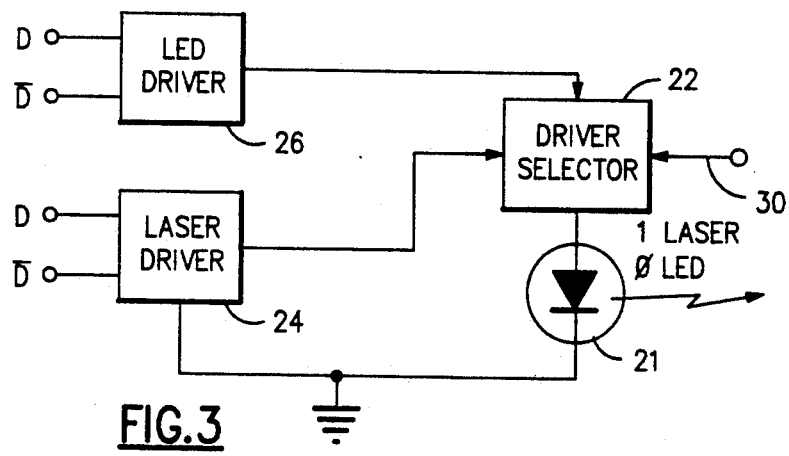
FIG. 3 is a block diagram of a transmitter in accordance with the teachings of this invention.

FIG. 3 is a block diagram of a transmitter in accordance with the teachings of this invention. Here a single injection laser diode 21 is coupled via a switch 22 to one of two drivers; a laser diode operating mode driver 24 and a light-emitting diode operating mode driver 26. The drivers 24 and 26 each have differential inputs labeled D and $\overline{D}$. The switch 22 may be a conventional semiconductor switch whose position (i.e., coupling diode 21 to driver 24 or 26) is determined by the logic level on input operating mode selection input 30.

Laser diode operating mode driver 24 may be a conventional design known and used in the art as a digital data transmitter. The laser operating mode drive 24 provides a driver current to the diode 21 above the threshold $I_0$. When selected by switch 22, driver 24 typically provides a drive current to diode 21 which is modulated by the data signal so that it varies between $I_1$ and $I_2$ (FIG. 2) producing a light power output modulated between $P_1$ and $P_2$ by an input on data input D and $\overline{D}$.

Similarly, light-emitting diode operating mode driver 26 may be of a suitable design known in the art. Here the driver provides a drive current to the diode 21 below its threshold $I_0$. Typically, driver 26 varies the input current to diode 21 between $I_3$ and $I_{off}$ (FIG. 2) producing light power output from $P_0$ to $P_3$ in accordance with the input data on line D and $\overline{D}$.

While the invention has been described in terms of a single preferred embodiment, those skilled in the art will recognize that the invention can be practiced with modification within the spirit and scope of the appended claims.

What is claimed is:

1. A transmitter for transmitting data over a fiber optic transmission link to a photoresponsive detector, comprising:
   a laser diode;
   first means for driving said laser diode with a data-modulated current that exceeds a threshold current to cause said laser diode to lase and generate a relatively high-power coherent light output;
   second means for driving said laser diode with a data-modulated current that remains below said threshold current to cause said laser diode to generate a relatively low-power, spontaneous-emission light output; and
   means for selectively coupling said laser diode to said first means or said second means.

2. A method of operating an injection laser diode transmitter operable in a lasing mode in response to a drive current above a predetermined current threshold and in a spontaneous emission light output mode in response to a drive current below said predetermined current threshold, including the steps of:
   generating a control signal having either a first or a second value;
   coupling a drive current above said predetermined current threshold to said diode in response to said first value of said control signal to cause said diode to generate a lasing light output signal;
   coupling a drive current below said predetermined current threshold to said diode in response to said second value of said control signal to cause said diode to generate a spontaneous-emission light output signal;
   coupling the light output signal generated by said diode to a fiber optic data transmission line.

* * * * *